United States Patent [19]
Koda

[11] Patent Number: 5,982,714
[45] Date of Patent: Nov. 9, 1999

[54] LASER BEAM ADJUSTING FOR MAGNETIC FIELD MODULATION OVERWRITE MAGNETO-OPTICAL RECORDING DEVICE

[75] Inventor: Tomohiro Koda, Tokyo, Japan

[73] Assignee: Sony Corporation, Tokyo, Japan

[21] Appl. No.: 09/001,172

[22] Filed: Dec. 30, 1997

[30] Foreign Application Priority Data

Jan. 10, 1997 [JP] Japan ................................. 9-013195

[51] Int. Cl.⁶ ........................................................ G11B 11/00
[52] U.S. Cl. .............................. 369/13; 369/116; 369/54
[58] Field of Search ............................... 369/13, 54, 116, 369/110, 14; 360/59, 114; 365/122

[56] References Cited

U.S. PATENT DOCUMENTS

| | | | |
|---|---|---|---|
| 4,712,203 | 12/1987 | Saito et al. | 369/13 |
| 4,907,211 | 3/1990 | Horimai et al. | 369/13 |
| 5,341,360 | 8/1994 | Johann et al. | 369/116 |
| 5,485,433 | 1/1996 | Satomura et al. | 369/13 |
| 5,684,765 | 11/1997 | Matsumoto et al. | 369/13 |
| 5,808,972 | 9/1998 | Matsumoto et al. | 369/13 |
| 5,825,724 | 10/1998 | Matsumoto et al. | 369/13 |
| 5,831,943 | 11/1998 | Kurita et al. | 369/13 |
| 5,862,103 | 1/1999 | Matsumoto et al. | 369/13 |

*Primary Examiner*—Tan Dinh
*Attorney, Agent, or Firm*—Frommer Lawrence & Haug, LLP.; William S. Frommer

[57] ABSTRACT

The invention provides a laser strobe type magneto-optical recording apparatus wherein the recording laser power can be set in conformity with an influence of variations such as environmental variations arising from dust sticking to an objective lens, a disk and so forth or secular changes of an optical part, a disk and so forth to assure a high degree of reliability. To a disk initialized with an applied magnetic field of the S pole beforehand, the N pole is applied for a predetermined laser pulse outputting period set after each predetermined fixed interval to record a test pattern. Then, based on a reproduction signal of the test pattern, the recording laser power is adjusted and set so that the length of a pit recorded area formed corresponding to the laser pulse outputting period in the direction of a track may be appropriate.

5 Claims, 10 Drawing Sheets

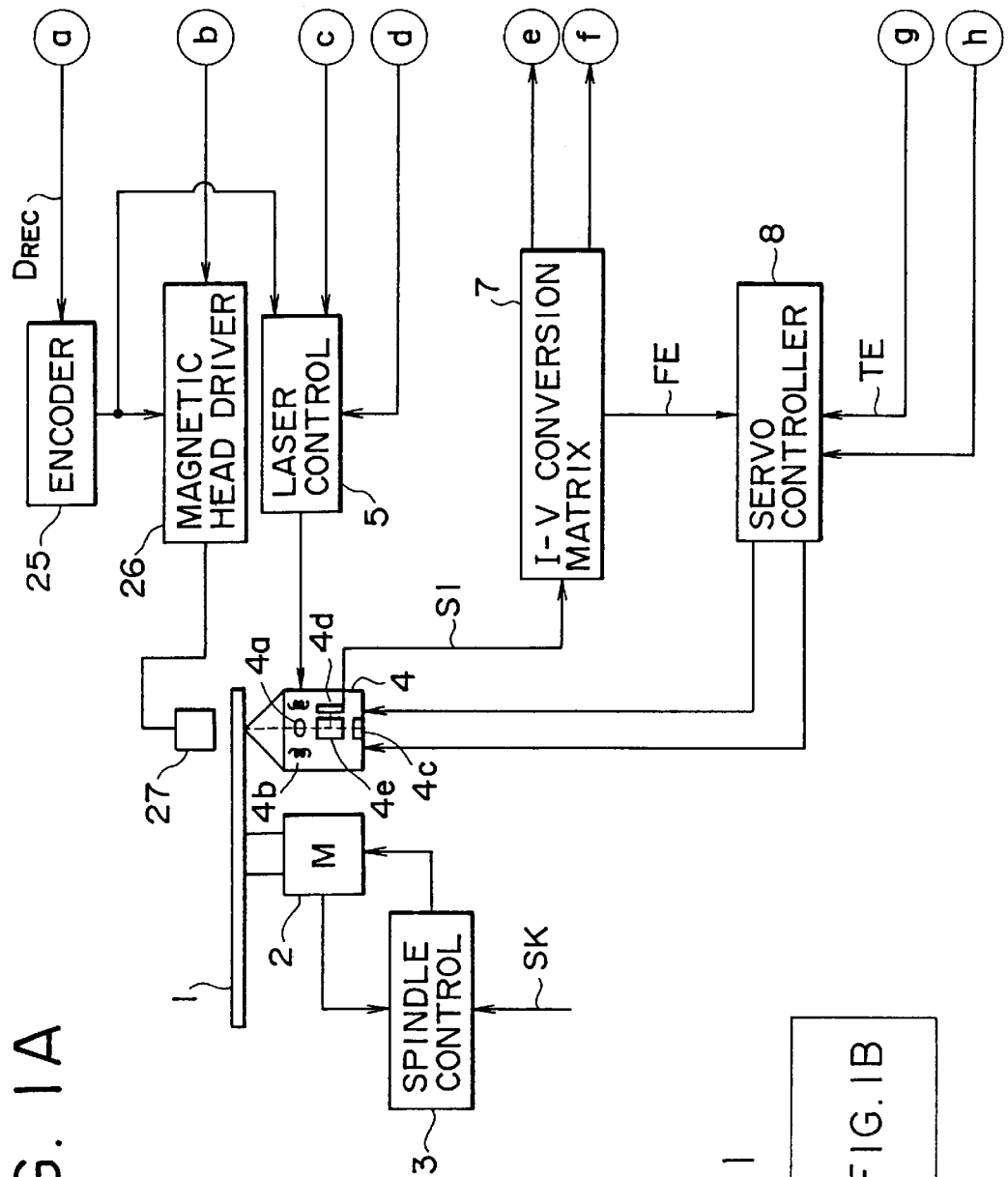
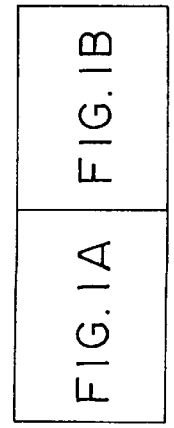
FIG. IA
FIG. I
| FIG.IA | FIG.IB |

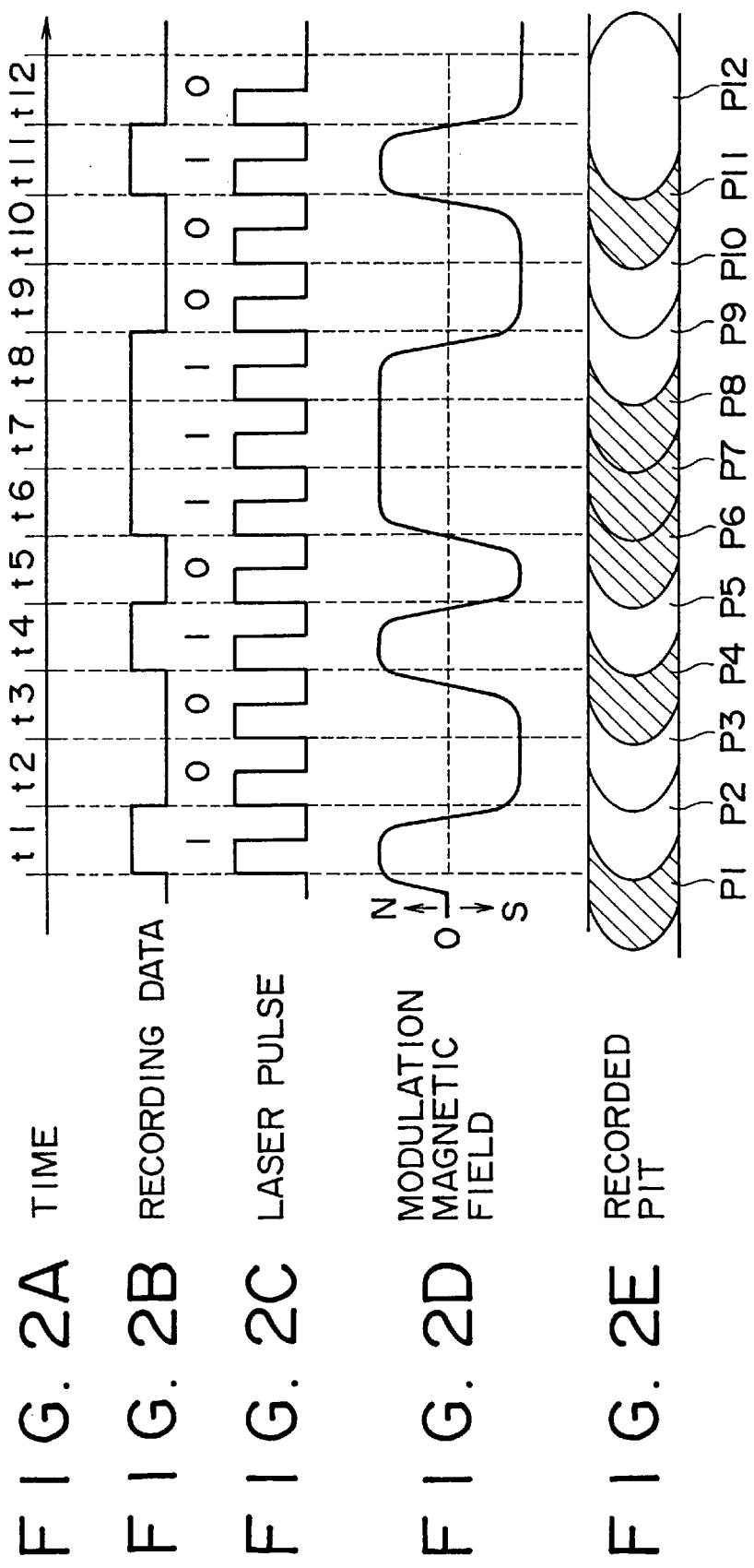

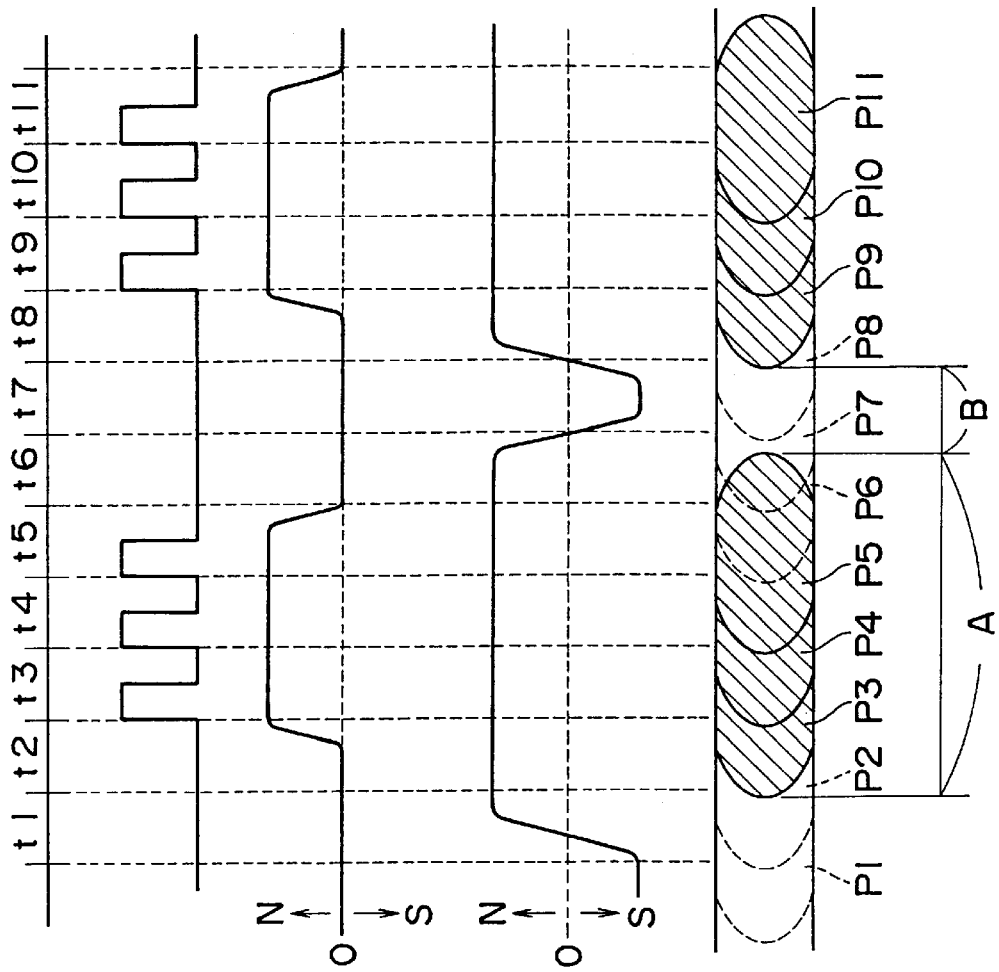

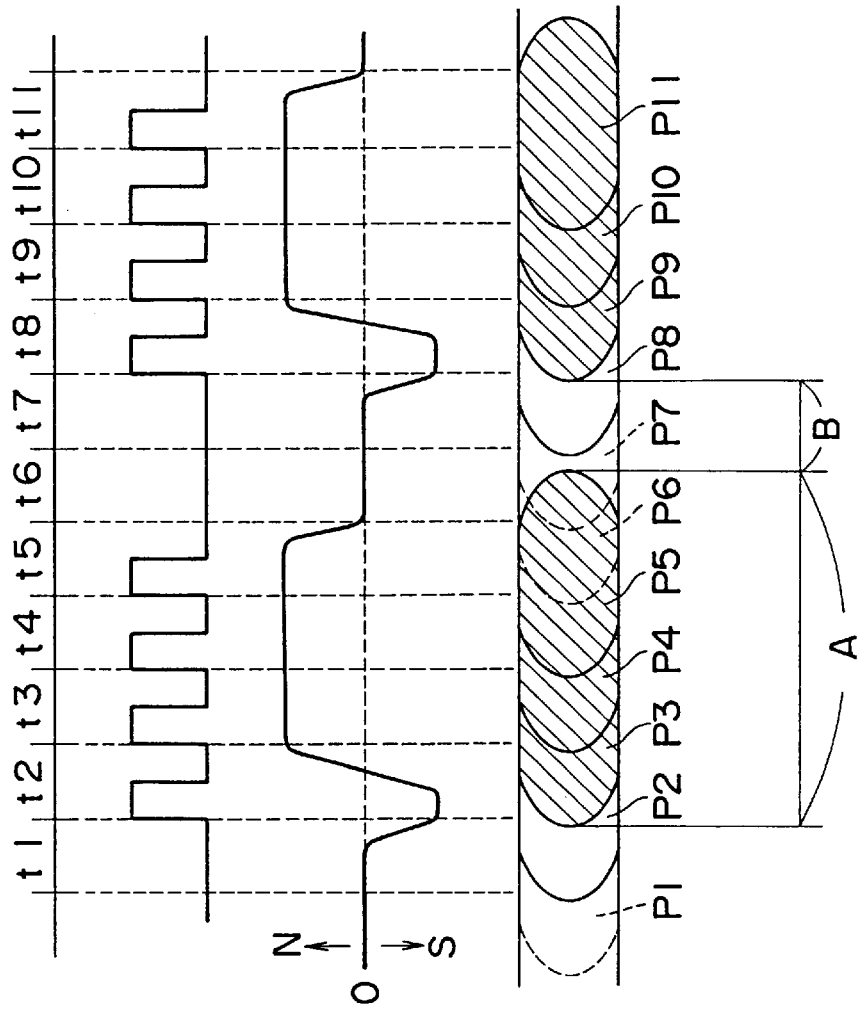

LASER BEAM ADJUSTING FOR MAGNETIC FIELD MODULATION OVERWRITE MAGNETO-OPTICAL RECORDING DEVICE

BACKGROUND OF THE INVENTION

This invention relates to a magneto-optical recording apparatus for a recording medium, and more particularly to a laser strobe type magneto-optical recording apparatus for magneto-optically recording a recording medium.

Disk type recording media such as optical disks and magneto-optical disks as portable media have been and are being spread widely. Particularly, magneto-optical disks (MO disks) which allow re-writing of data are regarded suitable as media for use with computers.

By the way, in order to allow appropriate recording or reproduction of data onto or from a magneto-optical disk, the output power of laser light to be irradiated upon the disk upon recording (the output power will be hereinafter referred to merely as recording laser power) must be set appropriately. To this end, an appropriate recording laser power must be set upon recording.

Conventionally, a photo-detector in an optical pickup converts an amount of laser light emitted from a laser diode into a voltage value and detects it, and an optimum recording laser power is set based on the thus detected voltage value. In other words, setting of the recording laser power is completed within the optical pickup.

However, it is known that the optimum recording laser power is varied by various conditions such as environmental variations such as, for example, dust sticking to a disk or an objective lens which composes an optical pickup and secular changes of various optical parts of the optical pickup or the disk itself.

Therefore, with such a conventional setting method for a recording laser power which is performed in an optical pickup as described above, it is difficult to set a recording laser power which is always optimum in conformity with such conditional variations as described above.

SUMMARY OF THE INVENTION

It is an object of the present invention to provide a laser strobe type magneto-optical recording apparatus wherein the recording laser power can be set in conformity with an influence of variations of external conditions, secular changes of optical parts or a disk and so forth to assure a high degree of reliability.

In order to attain the object described above, according to an aspect of the present invention, there is provided a magneto-optical recording apparatus of the laser strobe magnetic field modulation overwriting type which successively overwrites marks in a displaced condition by a fixed distance from each other to record data onto a magneto-optical recording medium, comprising first recording means for recording a plurality of marks of a first polarity over a distance longer than a plurality of times the fixed distance in a particular area of a magneto-optical recording medium, second recording means for recording marks of a second polarity opposite to the first polarity into the particular area of the magneto-optical recording medium while skipping the marks of the first polarity after each predetermined interval so that one or more marks of the first polarity may remain after each predetermined interval, reproduction means for reproducing the marks recorded on the magneto-optical recording medium to obtain a reproduction signal which has a first signal level based on the first polarity and a second signal level based on the second polarity, and determination means for determining a recording laser power based on a relationship in length between a period of the first signal level of the reproduction signal and a period of the second signal level.

According to another aspect of the present invention, there is provided a magneto-optical recording apparatus for recording a data signal onto a magneto-optical recording medium, comprising laser emission means for emitting laser light onto the magneto-optical recording medium, a magnetic head for applying a magnetic field to the magneto-optical recording medium, first initialization means for causing the laser emission means to emit laser light intermittently after each fixed period while a magnetic field of a first polarity is successively applied to the magneto-optical recording medium by the magnetic head so that a plurality of marks of the first polarity are recorded into a particular area of the magneto-optical recording medium such that each two successive ones of the marks of the first polarity overlap by a fixed amount with each other, second initialization means for applying a magnetic field of a second polarity opposite to the first polarity into the particular area of the magneto-optical recording medium and causing the laser emission means to emit laser light to the magneto-optical recording medium intermittently after each fixed interval over a first period equal to M times long the fixed interval, M being a natural number, and for causing the laser emission means to stop the emission of the laser light to the magneto-optical recording medium over a second period equal to N times long the fixed interval, N being a natural number, the second initialization means alternatively performing the operations for the first period and the second period, reproduction means for reproducing the marks recorded on the magneto-optical recording medium to obtain a reproduction signal which has a first signal level based on the first polarity and a second signal level based on the second polarity, and determination means for determining a recording laser power based on a relationship in length between a period of the first signal level of the reproduction signal and a period of the second signal level.

According to a further aspect of the present invention, there is provided a method of determining a recording laser power for a magneto-optical recording apparatus of the laser strobe magnetic field modulation overwriting type which successively overwrites marks in a displaced condition by a fixed distance from each other to record data onto a magneto-optical recording medium, comprising the steps of recording a plurality of marks of a first polarity over a distance longer than a plurality of times the fixed distance in a particular area of a magneto-optical recording medium, recording marks of a second polarity opposite to the first polarity into the particular area of the magneto-optical recording medium while skipping the marks of the first polarity after each predetermined interval so that one or more marks of the first polarity may remain after each predetermined interval, reproducing the marks recorded on the magneto-optical recording medium to obtain a reproduction signal which has a first signal level based on the first polarity and a second signal level based on the second polarity, and determining a recording laser power based on a relationship in length between a period of the first signal level of the reproduction signal and a period of the second signal level.

With the magneto-optical recording apparatus and the recording laser power determination method for a magneto-optical recording apparatus, since a physical data area length obtained from a test pattern recorded actually on a recording medium is detected from a reproduction signal and the recording laser power is set based on the detected physical data area length so that the particular physical data area length in the test pattern recorded actually on the recording medium may be appropriate, the recording laser power can be set so as to absorb an influence of environmental variations caused, for example, by dust sticking to the disk or a lens, secular changes of an optical part, the disk and so forth or a difference in sensitivity between individual parts and so forth. In other words, correction can be performed in accordance with a variation upon recording laser power by such variations in condition as described above. Consequently, the data recording apparatus has an assured reliability.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2A to 2E are diagrams illustrating ordinary recording operation by a laser strobe magnetic field modulation overwriting method;

FIGS. 4A to 4E are waveform diagrams illustrating recording operation of the test pattern of the recording and reproduction apparatus of FIG. 1(A,B);

FIG. 9A to 9D are diagrams illustrating different recording operation of a test pattern.

DESCRIPTION OF THE PREFERRED EMBODIMENT

<1. Construction of Recording and Reproduction Apparatus>

Figure 1B:
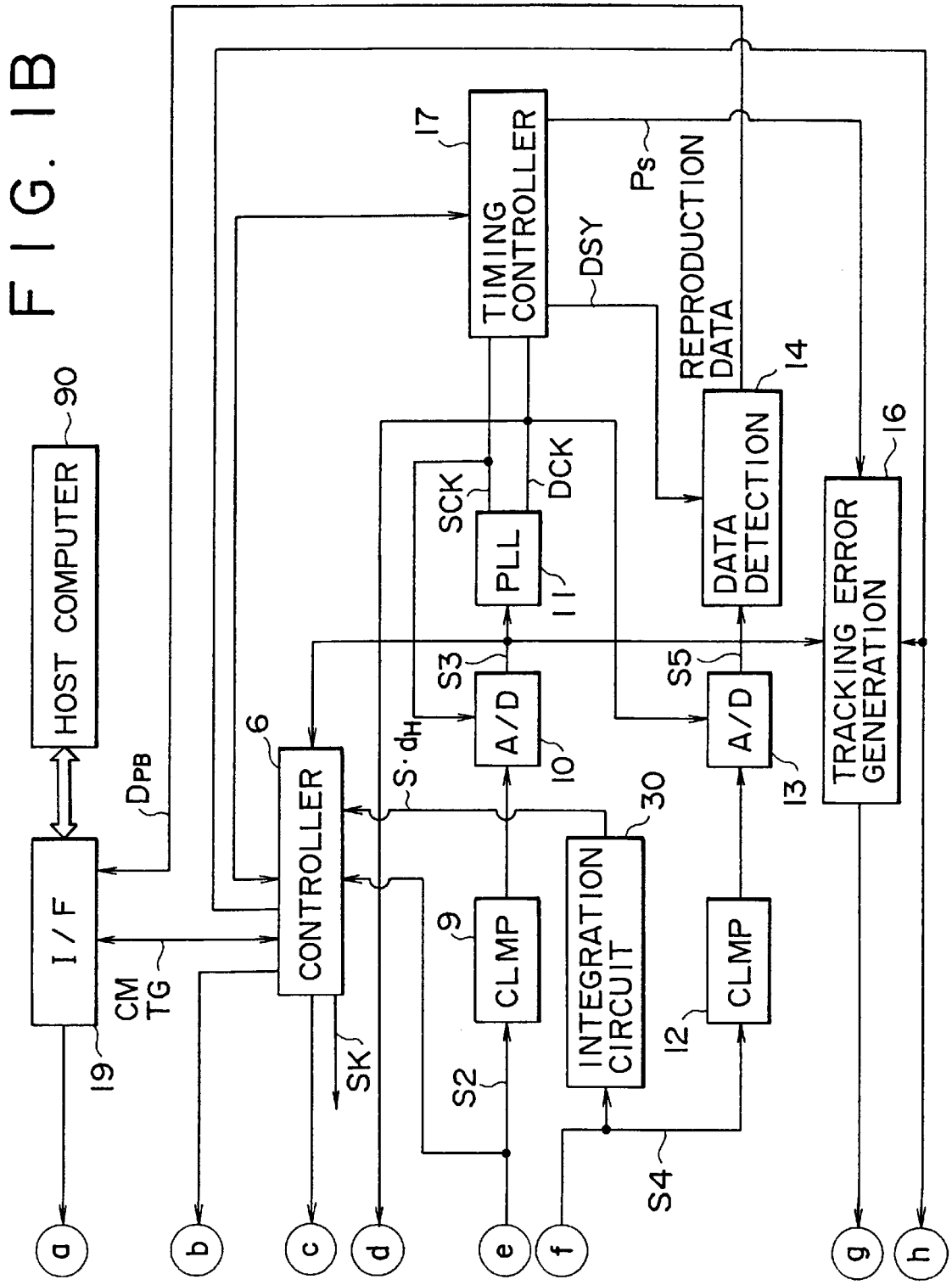
FIG. 1(A,B) is a block diagram showing a construction of a recording and reproduction apparatus to which the present invention is applied.

Referring first to FIG. 1(A,B), there is shown in block diagram a recording and reproduction apparatus to which the present invention is applied. The recording and reproduction apparatus is of the type wherein a magneto-optical disk is used as a recording medium. In FIG. 1(A,B), a magneto-optical disk used in the recording and reproduction apparatus is denoted at 1 and is rotated at a predetermined speed by a spindle motor 2. Rotational speed servo control of the spindle motor 2 is performed by a spindle control section 3.

For example, the spindle control section 3 detects the rotational speed of the spindle motor 2 based on an FG pulse signal (frequency signal synchronized with the rotational speed) from the spindle motor 2 and compares the rotational speed of the spindle motor 2 and reference speed information SK supplied thereto from a controller 6 with each other to detect error information between them. Further, the spindle control section 3 effects acceleration or deceleration of the spindle motor 2 in accordance with the error information to realize rotation of the magneto-optical disk 1 at a required rotational speed.

While the magneto-optical disk 1 is rotating, laser light from an optical pickup 4 is irradiated upon the magneto-optical disk 1. The optical pickup 4 includes a laser light source 4c which may be, for example, a laser diode or a laser coupler, an optical system 4e including a lens, a beam splitter and so forth, an objective lens 4a serving as an output end for the laser light, a detector 4d for detecting reflected light from the magneto-optical disk 1, and a biaxial mechanism 4b for holding the objective lens 4a for movement in a tracking direction and a focusing direction.

An on/off state and an output power level of a laser output from the laser light source 4c of the optical pickup 4 are controlled by a laser control section 5.

The recording and reproduction apparatus is connected to a host computer 90 by an interface section 19 thereof and executes a data recording or reproduction operation when the controller 6 receives a recording request or a reproduction request from the host computer 90.

Upon recording, data to be recorded are supplied together with a recording request from the host computer 90. The recording data $D_{REC}$ are supplied from the interface section 19 to an encoder 25, by which they are encoded.

The recording and reproduction apparatus of the present embodiment adopts, as a recording method thereof, a laser strobe magnetic field modulation overwriting method. A magneto-optical disk apparatus which employs the laser strobe magnetic field modulation overwriting method is disclosed in U.S. Pat. No. 4,907,211 assigned to the same assignee as that of the present application. In the recording method just mentioned, upon recording, the controller 6 controls the laser control section 5 so that the laser light source 4c may emit a laser output in the form of a pulse (that is, intermittently). Then, the recording data encoded by the encoder 25 are supplied to a magnetic head driver 26, which thus drives a magnetic head 27 so that a magnetic field of the N or S pole is applied from the magnetic head 27 in response to the recording data. As a result, the recording data are recorded as magnetic field information onto the magneto-optical disk 1. A detailed example of the recording operation will be hereinafter described.

The data reading position by the optical pickup 4 is movable in a radial direction of the magneto-optical disk 1. Though not shown particularly, a thread mechanism which moves the entire optical pickup 4 in a radial direction of the magneto-optical disk 1 is provided. Thus, when the reading position is to be varied over a comparatively long distance, the optical pickup 4 is moved by the thread mechanism. On the other hand, when the objective lens 4a is to be moved in a radial direction of the magneto-optical disk 1, that is, when the reading position is to be varied over a comparatively short distance by a tracking servoing operation, the objective lens 4a is moved by the biaxial mechanism 4b.

It is to be noted that the thread mechanism for moving the optical pickup 4 may be replaced by a mechanism which slidably moves the magneto-optical disk 1 together with the spindle motor 2.

On the other hand, the objective lens 4a is moved in a direction toward or away from the magneto-optical disk 1 by the biaxial mechanism 4b to effect focusing control of a laser spot LSP.

The detector 4d of the optical pickup 4 may be, for example, a four-piece detector having four light receiving areas, or a detector which detects magnetic data for individual polarized light components by a Kerr effect to obtain an RF signal as magneto-optical data.

From each light receiving area of the detector 4d, a current signal S1 corresponding to an amount of light received thereby is outputted, and the current signals S1 are supplied to an I/V conversion matrix amplifier 7. The I/V conversion matrix amplifier 7 performs current to voltage conversion of the current signals S1 and performs calculation processing of the current signals S1 from the light receiving areas of the optical pickup 4 to produce required signals such as an RF signal, a push-pull signal, and a focusing error signal FE.

The focusing error signal FE which serves as error information of the focusing condition is supplied to a servo controller 8. The servo controller 8 includes a focusing phase compensation circuit and a focusing driver not shown as processing elements of the focusing system, and generates a focusing drive signal based on the focusing error signal FE and applies the focusing driving signal to a focusing coil of the biaxial mechanism 4b. Thus, a focusing servo system which converges the position of the objective lens 4a at a just focus point is constructed.

From the I/V conversion matrix amplifier 7, an RF signal to be used for generation of a servo clock signal SCK and a data clock signal DCK is outputted as a signal S2.

The signal S2 is supplied to a clamp circuit 9, by which low frequency variations of the RF signal are removed from the signal S2, and then to an A/D converter 10, by which it is converted into a digital signal S3.

The signal S3 is supplied to the controller 6, a PLL circuit 11 and a tracking error generation section 16.

The PLL circuit 11 controls the oscillation frequency of an internal oscillator based on a phase error between the signal S3 and a signal obtained by dividing the oscillation output of the internal oscillator to generate a servo clock signal SCK synchronized with the RF signal. The servo clock signal SCK is used as a sampling clock signal by the A/D converter 10 and is supplied also to a timing controller 17.

Further, the PLL circuit 11 divides the servo clock signal SCK to produce a data clock signal DCK and supplies the data clock signal DCK to the timing controller 17 and the laser control section 5. The data clock signal DCK is used also as a sampling clock signal by an A/D converter 13.

The timing controller 17 generates required timing signals to the individual components based on the servo clock signal SCK and the data clock signal DCK.

For example, the timing controller 17 generates a sampling timing signal Ps to be used for extraction of servo pits for a three-phase tracking operation, and a synchronizing timing signal DSY to be used for a decoding operation by a data detection section 14.

A tracking error signal TE by so-called three-phase tracking control is generated by the PLL circuit 11, timing controller 17 and tracking error generation section 16 and supplied to the servo controller 8.

From the I/V conversion matrix amplifier 7, an RF signal or a push-pull signal to be used for data extraction is outputted as a signal S4. The signal s4 is supplied to a clamp circuit 12, by which low frequency variations of the RF signal are removed, and then to the A/D converter 13, by which it is converted into a digital signal S5.

Further, in the recording and reproduction apparatus, the signal S4 is supplied also to an integration circuit 30. The integration circuit 30 receives a reproduction RF signal of a test pattern recorded in such a manner as hereinafter described, obtains an integration output, for example, at a data part at which the value of the reproduction signal is "1 (in this instance, the N pole)" or another data part at which the value of the reproduction signal is "0" (in this instance, the S pole)", and outputs the integration output as a reproduction signal time length information signal $S \cdot d_H$ to the controller 6.

Meanwhile, the signal S5 from the A/D converter 13 mentioned above is supplied to the data detection section or decoder 14. The data detection section 14 performs data decoding in response to a synchronizing timing signal DSY generated by the timing controller 17 in response to the data clock signal DCK to obtain reproduction data $D_{PB}$. In this instance, the data detection section 14 performs, for example, waveform equalization processing, demodulation processing corresponding to modulation processing adopted as a recording format, and error correction processing and outputs a resulting signal as the reproduction data $D_{PB}$.

The reproduction data $D_{PB}$ are supplied to the host computer 90 through the interface section 19.

<2. Recording Laser Power Setting> a. Example of Ordinary Recording Operation by Laser Strobe Magnetic Field Modulation Overwriting Method Subsequently, a setting operation for the recording laser power of the recording and reproduction apparatus is described. In the present recording and reproduction apparatus, since the laser strobe magnetic field modulation overwriting method is adopted as the recording method described hereinabove, even in setting of the recording laser power by the recording and reproduction apparatus which is described below, recording of a test pattern is performed in accordance with the laser strobe magnetic field overwriting method. Therefore, prior to the setting operation mentioned above, an example of ordinary recording operation by the laser strobe magnetic field modulation overwriting method is described with reference to FIG. 2.

For example, if it is assumed that recording data $D_{REC}$ are obtained with a pattern indicated by FIG. 2B in accordance with timings of passage of time indicated by periods t1 to t12 by FIG. 2A, then a modulation magnetic field which is outputted from the magnetic head 27 in accordance with the recording data $D_{REC}$ has, for example, such a waveform FIG. 2D. In this instance, the magnetic field is modulated such that data of "1" corresponds to the N pole while data of "0" corresponds to the S pole.

Then, each time laser light is outputted as a pulse at a timing indicated by FIG. 2C in response to the magnetic field indicated by FIG. 2D, recorded pits or marks P1 to P12 are successively formed in such a manner as indicated by FIG. 2E on a track of the magneto-optical disk 1. The recorded pits P1 to P12 indicated by FIG. 2E are recorded in a corresponding relationship to the recording data outputted within the periods t1 to t12. In this instance, each recorded pit formed with the N pole (that is, data of "1") is indicated by slanting lines.

As can be seen from FIG. 2, when a recorded pit is formed in an ordinary recording condition, it is recorded such that it partially overwrites a recorded pit formed immediately precedently. On the other hand, if, for example, the period t12 is a period in which the last recording operation is performed, then the recorded pit P12 recorded in a corresponding relationship on the magneto-optical disk 1 has a full shape as a recorded pit without being overwritten.

b. Example of Test Pattern Recording Operation

Subsequently, a test pattern to be recorded onto a disk in order to set the recording laser power is described with reference to FIGS. 3 and 4. The test pattern is recorded into, for example, a test area of the magneto-optical disk 1 into and from which test recording and reproduction are to be performed.

Upon recording of the test pattern, an initialization operation for successively recording a predetermined area (track) in the test area of a disk fully with data of the same polarity is performed. This condition is illustrated in FIG. 3.

Figures 3A, 3B:
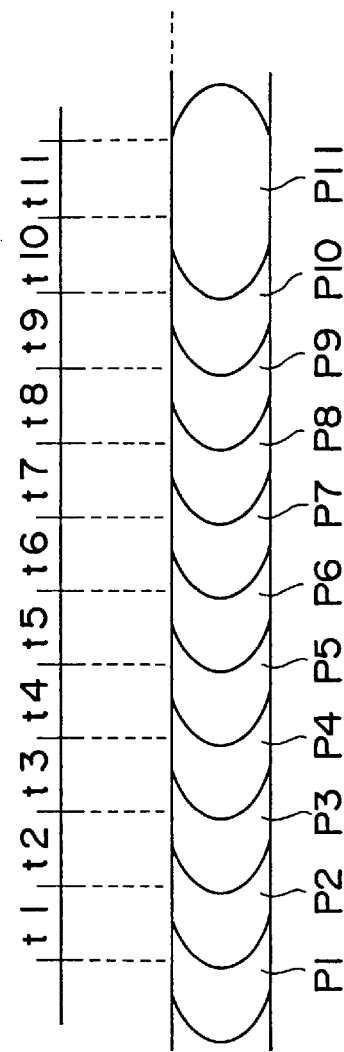
FIGS. 3A and 3B are charts illustrating recording operation of the recording and reproduction apparatus of FIG. 1(A,B) upon initialization of a disk as recording operation of a test pattern.

In this instance, recording onto a track is performed such that recorded pits P1 to P11 formed as the periods t1 to t11 elapse as seen in FIG. 3A all have the S pole as seen in BFIG. 3B.

After initialization is performed in such a manner as described above, recording operation for recording the test pattern in such a manner as seen in FIG. 4 onto the recording track for which initialization has been performed in such a manner as described above is performed.

As recording operation in this instance, for example, within the periods t1 and t2 illustrated in FIG. 4A, no laser pulse is outputted, but outputting of a laser pulse is started in the period t3 and is repeated in the succeeding periods t4 and t5. In short, three laser pulses are successively outputted within the periods t3 to t5.

Then, in this instance, outputting of a laser pulse is stopped in the following periods t6 to t8. In short, outputting of a laser pulse is successively stopped within a period for three laser pulses.

Thereafter, a pattern of the outputting operation of laser pulses within the periods t3 to t8 is repeated by a predetermined number of times.

Then, a modulation magnetic field (recording magnetic field) having such a waveform as indicated by FIG. 4C is applied from the magnetic head 27 to the magneto-optical disk 1. In short, within the periods t3 to t5 and the periods t9 to t11 within which laser light is outputted as pulses, the N pole which is opposite in polarity to that of the modulation magnetic field which has been applied upon initialization formerly is applied.

As a result, recorded pits recorded on the track change from the condition shown in FIG. 3B to the condition shown in FIG. 4E.

In this instance, the recorded pits P1 and P2 remain in the S pole with which they were recorded upon initialization described hereinabove with reference to FIG. 3. Then, in the succeeding recorded pits P3 to P5, the N pole is successively recorded by laser pulses outputted within the periods t3 to 5, respectively. Then, within the periods t6 to t8, since recording of new pits is not performed, the recorded pit P5 recorded within the period t5 remains in a condition wherein the entire shape thereof remains as it is.

On the other hand, the recorded pits P6 to P8 remain in a condition in which they were recorded with the S pole upon initialization since no laser pulse was outputted and no recording was performed within the periods t6 to t8. However the recorded pits P6 and P7 are partially overwritten with and erased by the recorded pit P5.

In the present embodiment, N successive recording areas formed by the recorded pits P3 to P5 (recorded pits P9 to P11) are hereinafter referred to as pit recorded area A, and the remaining area of the areas of the recorded pits P6 to P8 which has not been erased by the pit recorded area A is hereinafter referred to as pit non-recorded area B.

As can be seen from the foregoing description, the test pattern in the present embodiment includes a predetermined number of repetitions of the pit recorded area A and the pit non-recorded area B indicated by FIG. 4E which appear alternately.

It is to be noted, in order to obtain such a test pattern as described above, it is only required that, within periods corresponding to the periods t3 to t5 and the periods t9 to t11 illustrated in FIG. 4, the N pole be applied as the modulation magnetic field, and within any other period, no particular polarity is required for the modulation magnetic field. Accordingly, the modulation magnetic field having, for example, such a waveform as seen in FIG. 4C may be replaced by such a modulation magnetic field as indicated by FIG. 4D.

Further, while the successive outputting period and stopping period of laser pulses in test pattern recording are individually set to periods corresponding to three outputting timings of laser pulses, they are not particularly limited to them. In short, as hereinafter described, only if care is taken so that, even if the recording laser power becomes considerably high to increase pit recorded areas A, adjacent pit recorded areas A may not overlap with each other, the successive outputting period and stopping period for laser pulses may individually be set suitably in accordance with a variation in various conditions.

c. Example of Detection of Reproduction Signal Time Length Information

Subsequently, reproduction signal time length information which is detected when the test pattern described above is reproduced is described. The reproduction signal time length information is used by the controller 6 to set an optimum recording laser power in such a manner as hereinafter described.

By the way, the size (pitch) of a recorded pit varies in accordance with the strength of the recording laser power. Accordingly, also the size of a recorded pit to be formed is determined decisively in accordance with the recording laser power when an appropriate recording/reproduction result is obtained. Therefore, in the present recording and reproduction apparatus, the recording laser power corresponding to the size of a recording bit when an appropriate recording/reproduction result is obtained is defined as an optimum laser power. Then, in the present recording and reproduction apparatus, a waveform pattern of a reproduction signal obtained by reproduction of the test pattern is detected as it corresponds to the size of a recorded pit as described below.

Figure 5A:
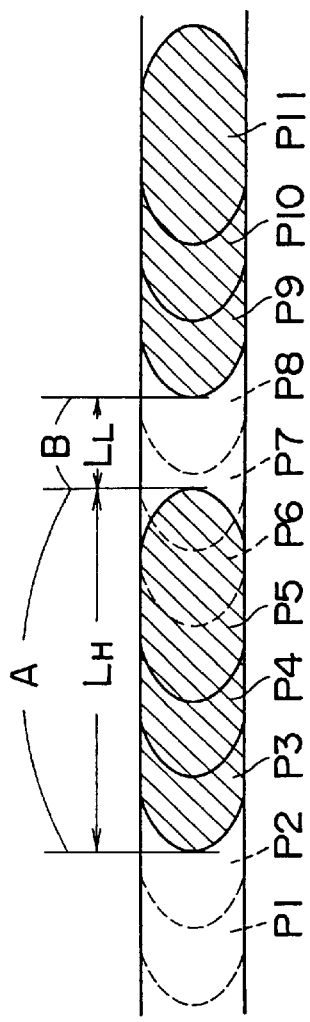
FIGS. 5A to 5C are diagrammatic views illustrating physical recorded conditions of the test pattern with different recording laser powers.
Figure 5B:
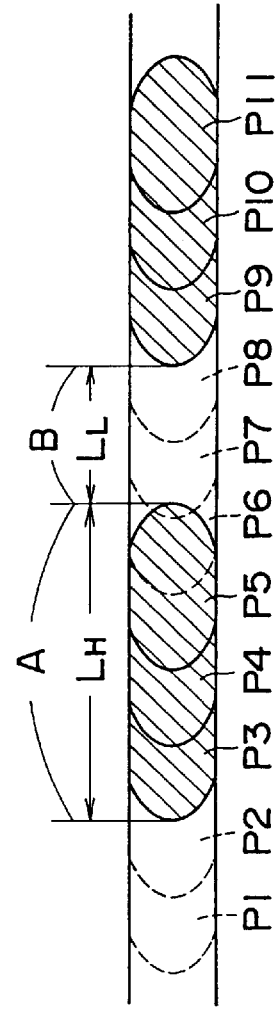
Figure 5C:
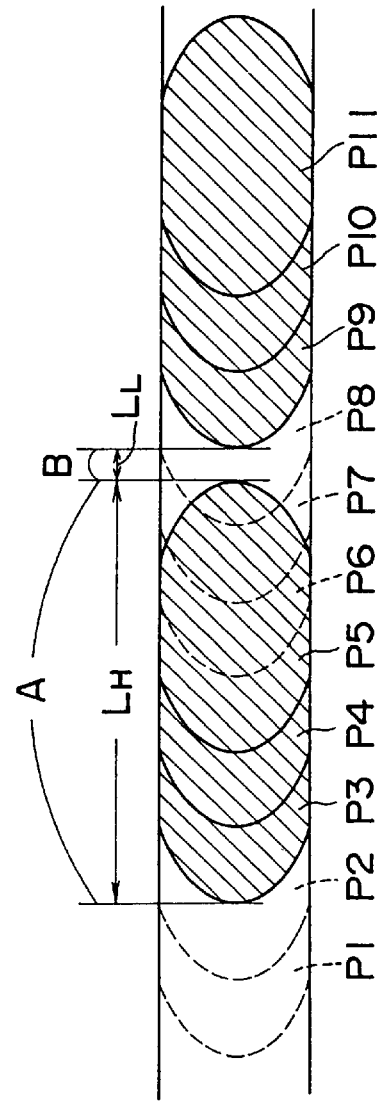

FIGS. 5A, 5B and 5C show recorded pits P1 to P12 obtained when the test pattern is recorded with different recording laser powers from each other. The recorded pits P1 to P11 are recorded by recording operation of the test pattern described hereinabove with reference to FIGS. 3 and 4.

FIG. 5A shows a pattern of the recorded pits P1 to P11 recorded with an optimum recording laser power $P_0$. In contrast, FIG. 5B shows another pattern of the recorded pits P1 to P11 recorded with a recording laser power PL lower than the optimum recording laser power $P_0$, and FIG. 5C shows a further pattern of the recorded pits P1 to P11 recorded with a recording laser power PH higher than the optimum recording laser power $P_0$.

As can be seen from FIGS. 5A, 5B and 5C, it is understood that the length (pit recorded area length) $L_H$ along the direction of a track of the pit recorded area A formed by the recorded pits P3 to P6 recorded successively from N data and the length (pit non-recorded area length) LL (of the pit non-recorded area B) between the end position of the recorded pit P6 in which the S pole was recorded resultantly upon initialization and the start position of the recorded pit P9 vary depending upon the recording laser power.

More particularly, the pit recorded area length $L_H$ increases as the recording laser power increases. This arises from the fact that, as the recording laser power increases, the size of a recorded pit increases. In contrast, the pit non-recorded area length LL decreases as the recording laser power increases. This arises from the fact that, for example, by the recorded pit P5 and the recorded pit P9 of the N pole, a region in which the pit non-recorded area B is overwritten extends also in the direction of a track.

Figures 6A, 6B, 6C, 6D:
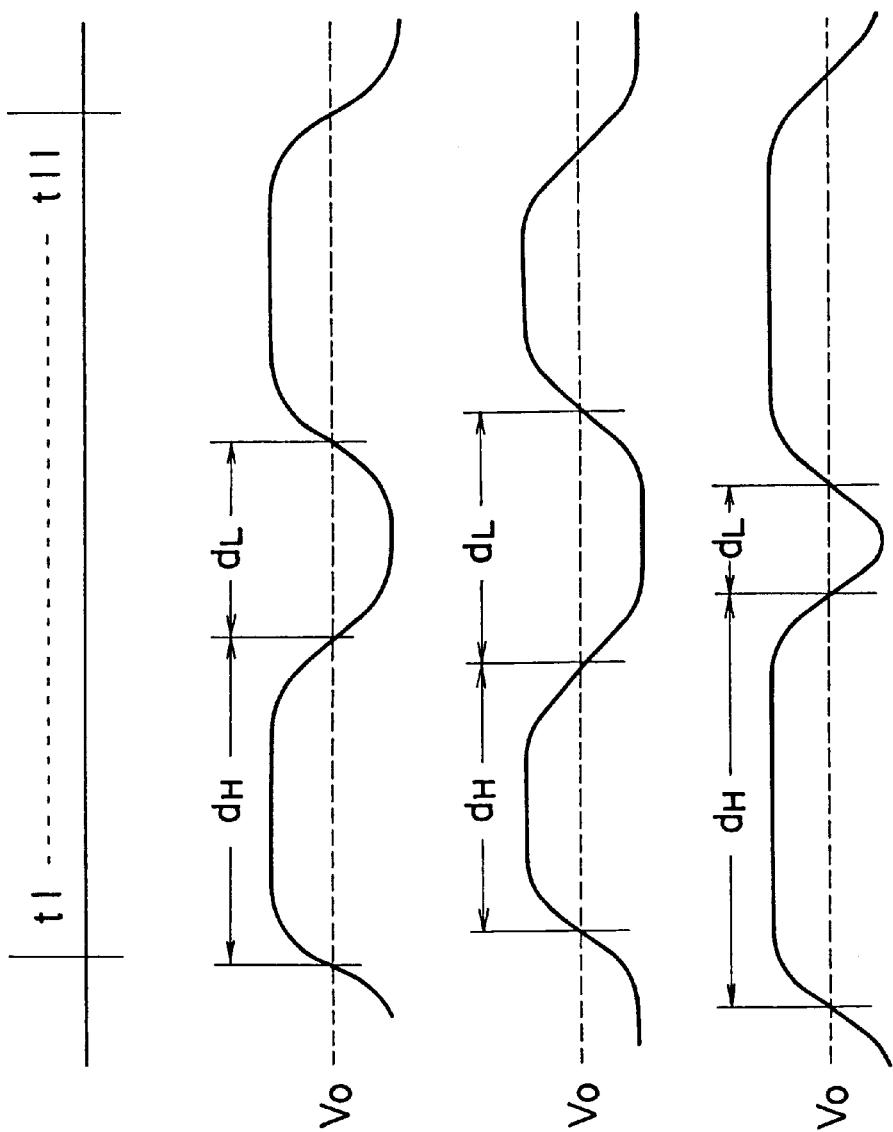
FIGS. 6A to 6D and 6E and 6F are diagrams illustrating reproduction signal waveforms of the test pattern with respect to different recording laser powers and graphs illustrating variation characteristics of a pit recorded region reproduction time and a pit non-recorded region reproduction time with respect to a recording laser power, respectively.

FIGS. 6B, 6C and 6D are waveform diagrams illustrating conditions of a reproduction RF signal obtained by reproduction of the test patterns illustrated in FIGS. 5A, 5B and 5C as time passes, respectively, and FIG. 6A illustrates the time base in a corresponding relationship to the periods t1 to t11 (refer to FIG. 4) upon recording.

The reproduction signal waveforms of the test patterns obtained in such a manner as seen in FIGS. 6B, 6C and 6D can be regarded, if it is assumed that a dc level $V_0$ is set, when the reproduction signals are viewed on the time base, signal waveforms in which a pit recorded area reproduction time $d_H$ which corresponds to a period within which the test pattern reproduction signal exhibits a level higher than the dc level $V_0$ and a pit non-recorded area reproduction time $d_L$ which corresponds to a period within which the test pattern reproduction signal exhibits another level lower than the dc level $V_0$.

Further, it can be considered that the pit recorded area length $L_H$ and the pit non-recorded area length $L_L$ illustrated in FIGS. 5A, 5B and 5C correspond to the pit recorded area reproduction time $d_H$ and pit non-recorded area reproduction time $d_L$ illustrated in FIGS. 6B, 6C and 6D, respectively. In other words, the pit recorded area reproduction time $d_H$ corresponds to a period obtained by reproduction of the pit recorded area length $L_H$ while the pit non-recorded area reproduction time $d_L$ corresponds to another period obtained by reproduction of the pit non-recorded area length $L_L$.

Further, as can be seen from FIGS. 6B, 6C and 6D, the pit recorded area reproduction time $d_H$ has a property that, similarly to the pit recorded area length $L_H$, it increases as the recording laser power increases. On the other hand, the pit non-recorded area reproduction time $d_L$ has another property that it decreases as the recording laser power increases.

Figure 6E:
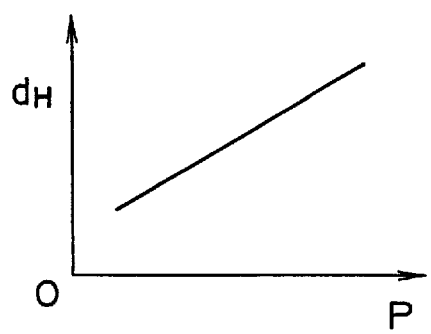
Figure 6F:
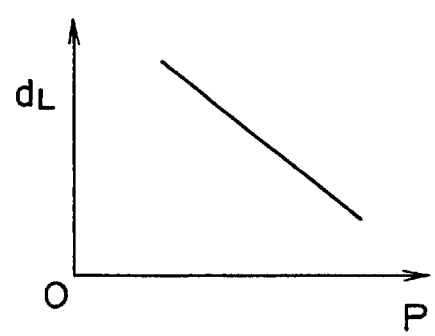

The relationships of the pit recorded area reproduction time $d_H$ and the pit non-recorded area reproduction time $d_L$ to the recording layer power P are illustrated in FIGS. 6E and 6F, respectively. It is to be noted that, in the present recording and reproduction apparatus, while the pit recorded area reproduction time $d_H$ or the pit non-recorded area reproduction time $d_L$ is detected from an integration value obtained by inputting the signal within the period to the integration circuit 30 (refer to FIG. 1), also the relationships between the integration values of the pit recorded area reproduction time $d_H$ and the pit non-recorded area reproduction time $d_L$ to the recording layer power P are similar to those illustrated in FIGS. 6E and 6F, respectively.

In the present recording and reproduction apparatus, a recording laser power which is determined optimum upon recording is set in the following manner.

Here, a case wherein the pit recorded area reproduction time $d_H$ corresponding to the pit recorded area length $L_H$ is set as reproduction time length information is described as an example. In this instance, in the present recording and reproduction apparatus, a pit recorded area reproduction time $d_{H0}$ obtained based on a size of a recorded pit with which an optimum recording/reproduction operation is expected is determined in advance by an examination.

Figure 7:
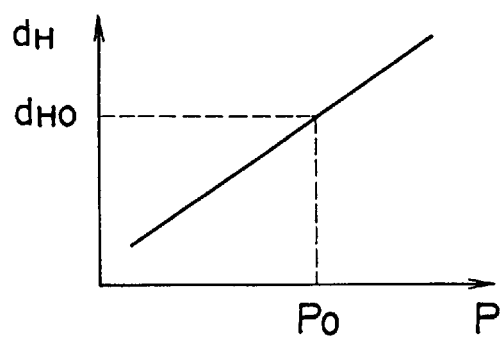
FIG. 7 is a diagram illustrating an appropriate relationship between the pit recorded region reproduction time and the recording laser power.

FIG. 7 illustrates a relationship of the pit recorded area reproduction time $d_H$ to the recording layer power P similar to that of FIG. 6E. Thus, in the present recording and reproduction apparatus, if it is determined, for example, that the position on the axis of ordinate indicated by a broken line in FIG. 7 is the optimum pit recorded area reproduction time $d_{H0}$, the recording laser power $P_0$ when the optimum pit recorded area reproduction time $d_{H0}$ is obtained is set as the optimum recording laser power.

It is to be noted that, if the pit non-recorded area reproduction time $d_L$ is alternatively set as reproduction time length information, then although detailed description is omitted, similarly as in the case of the pit recorded area reproduction time $d_H$, the pit non-recorded area reproduction time $d_L$ corresponding to a size of a recorded pit with which an optimum recording/reproduction operation is expected is determined in advance, and a recording laser power $P_0$ when the optimum pit non-recorded area reproduction time $d_L$ is obtained is set as the optimum recording laser power.

d. Processing Operation for Recording Laser Power Setting

Figure 8:
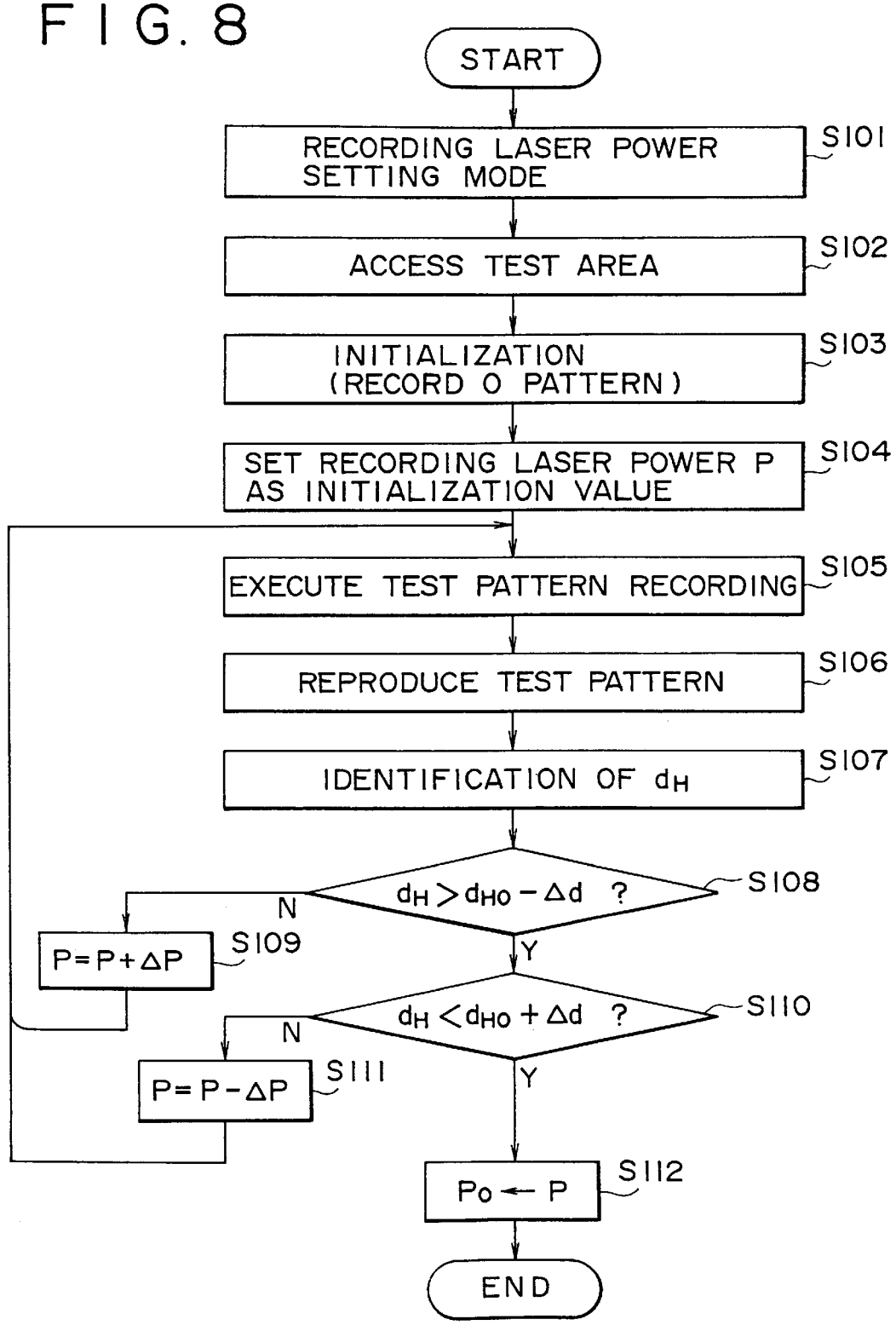
FIG. 8 is a flow chart illustrating a recording laser power setting process of the recording and reproduction apparatus of FIG. 1(A,B)

FIG. 8 is a flow chart illustrating processing operation for recording laser power setting of the recording and reproduction apparatus of the present embodiment. It is to be noted that a case wherein the pit recorded area reproduction time $d_H$ obtained by reproduction of a location of the pit recorded area A illustrated in FIG. 5 is utilized as reproduction time length information is described here. Further, this processing is executed by the controller 6.

In the routine illustrated in FIG. 8, a recording laser power setting mode is set first in step S101. The recording laser power setting mode may be entered, for example, when a magneto-optical disk 1 is loaded into the recording and reproduction apparatus (or after an magneto-optical disk 1 is loaded by each predetermined number of times) or after each fixed interval of time. It is to be noted here that an magneto-optical disk 1 has been loaded prior to step S101.

In next step S102, in order to record a test pattern as seen in FIGS. 3 and 4, control processing for accessing to the test area of the magneto-optical disk 1 is executed.

After the accessing in step S102 is completed, control processing for disk initialization for recording the pattern of 0 (data pattern of the S pole) described hereinabove with reference to FIG. 3 is executed. In the initialization processing, the 0 pattern is recorded for a period sufficient to perform processing in steps S105 to S111 by a plurality of cycles.

Then, the controller 6 sets the recording layer power P to an initial value set in advance in step S104 and then executes recording of the test pattern described hereinabove with reference to FIG. 4 in next step S105.

Thereafter, the controller 6 reproduces the test pattern as processing in step S106. When the test pattern is reproduced, the signal S4 which is a reproduction RF signal of the test pattern is supplied to the integration circuit 30. In this instance, the integration circuit 30 performs integration of the reproduction signal of the test pattern inputted thereto for a period of the reproduction signal obtained corresponding to the pit recorded area A (refer to FIG. 4), and outputs, based on the integration value, a reproduction signal time length information signal S·$d_H$ representative of the pit recorded area reproduction time $d_H$.

It is to be noted that, while the integration circuit 30 may possibly perform integration only for one cycle period of the reproduction signal in the pit recorded area A, it may alternatively perform integration for individual cycle periods of the reproduction signal of the pit recorded area inputted repetitively thereto and calculate an average value of the integration values. By the latter method, the detection accuracy is improved.

In step S107 next to step S106, the controller 6 identifies, from within the reproduction signal time length information signal S·$d_H$ inputted thereto from the integration circuit 30, the pit recorded area reproduction time $d_H$ of the pit recorded region recorded in step S103 formerly, whereafter the processing advances to step S108.

In step S108, the pit recorded area reproduction time $d_H$ identified in step S107 and the optimum pit recorded area reproduction time $d_{H0}$ set in advance are compared with each other to detect whether or not the following expression (1)

$$d_H > d_{H0} - \Delta d \tag{1}$$

is satisfied, where $\Delta d$ represents a margin value set in advance with reference to the optimum pit recorded area reproduction time $d_{H0}$.

If it is discriminated in step S108 that the expression (1) is not satisfied, that is, if it is discriminated that the pit recorded area reproduction time $d_H$ identified in step S107 is shorter than the optimum bit recorded region reproduction time ($d_{H0} - \Delta d$), then the processing advances to step S109. The negative discrimination in step S108 is obtained when the bit recorded region length is smaller than an appropriate value because the recording laser power is lower than its appropriate value (which corresponds, for example, to the condition illustrated in FIG. 5B).

Therefore, in step S109, processing for setting the recording layer power P at present so that it may be increased by a predetermined value $\Delta P$ as given by $$P = P + \Delta P \tag{2}$$

is performed, and thereafter, the processing returns to step 105. Since the processing in steps S105 et seq. is executed past step S109 in this manner, a recording operation of the test pattern with the recording layer power P which is incremented by the value $\Delta P$ and a succeeding reproduction operation as well as a detection operation of the pit recorded area reproduction time $d_H$ are repeated until after it is discriminated in step S108 that the expression (1) is satisfied.

Then, if it is discriminated in step S108 that the expression (1) is satisfied, then the processing advances to step S110.

In step S110, the pit recorded area reproduction time $d_H$ identified in step S107 and the optimum pit recorded area reproduction time $d_{H0}$ set in advance are compared with each other to discriminate whether or not the following expression (3)

$$d_H < d_{H0} + \Delta d \tag{3}$$

is satisfied, where $\Delta d$ represents a margin value set in advance with reference to the optimum pit recorded area reproduction time $d_H 0$.

If it is discriminated in step S110 that the expression (3) above is not satisfied, then this signifies that it is discriminated that the pit recorded area reproduction time $d_H$ identified in step S107 is higher than the optimum pit recorded area reproduction time ($d_{H0} + \Delta d$). Such a negative result in step S110 as just described is obtained when the pit recorded region length is larger than its appropriate length because the recording laser power is higher than its appropriate value (which corresponds, for example, to the condition illustrated in FIG. 5C).

In this instance, the controller 6 advances its processing to step S111, in which it executes processing for decreasing the recording layer power P at present by the predetermined value $\Delta P$ as given by the following expression (4):

$$P = P - \Delta P \tag{4}$$

whereafter the processing returns to step S105. In this instance, since the processing in steps S105 et seq. is performed for a next test region, a recording operation of the test pattern with the recording layer power P which is successively decreased by the value $\Delta P$ and a succeeding recording operation as well as a detection operation of the pit recorded area reproduction time $d_H$ are repeated until after it is discriminated in step S110 that the expression (1) is satisfied.

Then, if it is discriminated in step S110 that the expression (1) is satisfied, then the processing advances to step S12.

In the present recording and reproduction apparatus, when a positive result is obtained in both of steps S108 and S110, the pit recorded area reproduction time $d_H$ of the pit recorded region recorded with the recording layer power P at present falls within the range given by the following expression (5):

$$d_H 0 - \Delta d < d_H < d_{H0} + \Delta d \tag{5}$$

In other words, it is discriminated that the pit recorded area length $L_H$ recorded with the recording layer power P at present is an appropriate one.

Then, in step S112, processing for setting the recording layer power P at present so that it is set as the optimum recording laser power $P_0$, thereby ending the recording laser power setting mode.

Then, in succeeding ordinary recording operation, recording onto the disk with the recording laser power $P_0$ set in step S112 described above is performed.

In this manner, in the present embodiment, since the recording laser power is set so that the pit recorded area length $L_H$ (or the pit non-recorded area length $L_L$) actually recorded on a disk may be optimum, the recording laser power set in this instance is set so that it absorbs variations of conditions such as, for example, an environmental variation by dust or the like sticking to the disk or the objective lens and secular changes of the optical pickup or the disk. As a result, in the present embodiment, a recording laser power which is always optimum against such variations of conditions as described above can be set.

It is to be noted that, although detailed description is omitted, also where the pit non-recorded area reproduction time $d_L$ obtained by reproduction of a location of the pit non-recorded area B is utilized as reproduction time length information, setting of an optimum recording laser power can be realized by processing operation similar to that described hereinabove with reference to the flow chart of FIG. 8.

More particularly, the integration circuit 30 is modified such that an integration output of the pit non-recorded area reproduction time $d_L$ may be obtained therefrom and the pit non-recorded area reproduction time $d_L$ is identified in step S107. On the other hand, since the pit non-recorded area reproduction time $d_L$ varies such that the value thereof decreases as the recording laser power increases as seen in FIG. 6F, it is discriminated in step S108 whether or not the following expression (6):

$$d_L < d_L 0 + \Delta d \tag{6}$$

is satisfied, where $d_L0$ represents a predetermined margin value, and in step S110, it is discriminated whether or not the following expression (7):

$$d_L > d_L0 - \Delta d \quad (7)$$

is satisfied.

e. Another Example of Test Pattern Recording Operation

FIG. 9 illustrates another example of test pattern recording operation of the recording and reproduction apparatus of FIG. 1.

Referring to FIG. 9, in the example illustrated, for example, within periods t2 and t8 which are prior to periods t3 to t6 and t9 to t11 within which a laser pulse is outputted, a laser pulse is outputted as seen from FIG. 9B. It is to be noted that the polarity of the modulation magnetic field applied from the magnetic head 27 within the periods t2 and t8 is the S pole as seen in FIG. 9C.

The test pattern recorded at the output timings of laser pulses indicated by FIG. 9B by the modulation magnetic field illustrated in FIG. 9C are not resultantly different from the test pattern indicated by FIG. 4E. In this instance, however, the recorded pits P2 and P8 corresponding to the S pole data corresponding to the periods t2 and t8 are compulsorily recorded again upon test pattern recording.

For example, since, in ordinary recording, laser pulses are outputted successively, a recording face of a disk upon which the laser light is irradiated has some remaining heat also after the irradiation of laser light is ended. In contrast, when recording of a test pattern is performed at output timings of laser pulses illustrated, for example, in FIG. 4 is performed, there is a period within which laser pulses are not outputted successively (for example, the periods t1 to t2 and the periods t6 to t8), and within the period, the disk recording face exhibits a temperature condition considerably lower than that upon ordinary recording. Then, in FIG. 4, for example, the recorded pits P3 and P9 of the N pole are recorded within the period t3 and the period t9, respectively, on the disk recording face which is in such a low temperature condition. Consequently, when the recorded pits P3 and P9 are recorded, the temperature of the disk recording face remains in a condition lower than that upon recording of the recorded pits P4, P5, P10 and P11, and as a result, there is the possibility that the recorded pits P3 and P9 may be formed with a smaller size.

In contrast, when a test pattern is recorded in such a manner as illustrated in FIG. 9, since a laser pulse is outputted within the periods immediately prior to the periods within which the recorded pits P3 and P9 are recorded to record data of the S pole (form the recorded pits P2 and P8), recording of a recorded pit of the N pole is not started in such a low temperature condition as illustrated in FIG. 4. Consequently, the recorded pits P3 and P9 are recorded with an appropriate size, and also the detection accuracy of the pit recorded area length $L_H$ or the pit non-recorded area length $L_L$ can be improved as much readily.

It is to be noted that, while, in FIG. 9, one recorded pit of the N pole is recorded immediately before the pit recorded area A is recorded, this is a mere example, and two or more recorded pits of the N pole may be successively formed alternatively.

While the present invention is described in connection with the preferred embodiment, it is not limited to the specific embodiment and the embodiment can be modified suitably based on various conditions. For example, while the recording and reproduction apparatus of the embodiment includes the integration circuit 30 for detecting the pit recorded area length $L_H$ or the pit non-recorded area length $L_L$ as a reproduction signal time length and an integration value of a reproduction signal obtained from the integration circuit 30 is utilized, the integration circuit 30 may be replaced, for example, by a counter or a timer to which a reproduction signal reproduced in a period of the pit recorded area length $L_H$ or the pit non-recorded area length $L_L$ is inputted while a reproduction signal time length is detected based on the output of the counter or the timer.

Further, the present invention can naturally be applied to a recording apparatus of any other type which is constructed so as to record on a recording medium by a laser strobe magnetic field modulation overwriting method.

Having now fully described the invention, it will be apparent to one of ordinary skill in the art that many changes and modifications can be made thereto without departing from the spirit and scope of the invention as set forth herein.

What is claimed is:

1. A magneto-optical recording apparatus having a laser strobe magnetic field modulation overwriting capability which successively overwrites marks displaced by a fixed distance from each other to record data onto a magneto-optical recording medium, comprising:

first recording means for recording a plurality of marks of a first polarity over a distance longer than a plurality of times the fixed distance in a particular area of a magneto-optical recording medium;

second recording means for recording marks of a second polarity opposite to the first polarity into the particular area of the magneto-optical recording medium while skipping the marks of the first polarity after at least one predetermined interval so that at least one mark of the first polarity remains after each predetermined interval;

reproduction means for reproducing the marks recorded on the magneto-optical recording medium to obtain a reproduction signal which has a first signal level based on the first polarity and a second signal level based on the second polarity; and determination means for determining a recording laser power based on a relationship in length between a period of the first signal level of the reproduction signal and a period of the second signal level.

2. A magneto-optical recording apparatus for recording a data signal onto a magneto-optical recording medium, comprising:

laser emission means for emitting laser light onto the magneto-optical recording medium;

a magnetic head for applying a magnetic field to the magneto-optical recording medium;

first initialization means for causing said laser emission means to emit laser light intermittently after each fixed interval while a magnetic field of a first polarity is successively applied to the magneto-optical recording medium by said magnetic head so that a plurality of marks of the first polarity are recorded into a particular area of the magneto-optical recording medium such that each two successive ones of the marks of the first polarity overlap by a fixed amount with each other;

second initialization means for applying a magnetic field of a second polarity opposite to the first polarity into the particular area of the magneto-optical recording medium and causing said laser emission means to emit laser light to the magneto-optical recording medium intermittently after each fixed interval over a first period equal to M times long the fixed interval, M being a natural number, and for causing said laser emission means to stop the emission of the laser light to the magneto-optical recording medium over a second period equal to N times long the fixed interval, N being a natural number, said second initialization means alternatively performing the operations for the first period and the second period;

reproduction means for reproducing the marks recorded on the magneto-optical recording medium to obtain a reproduction signal which has a first signal level based on the first polarity and a second signal level based on the second polarity; and determination means for determining a recording laser power based on a relationship in length between a period of the first signal level of the reproduction signal and a period of the second signal level.

3. A magneto-optical recording apparatus according to claim 2, wherein said second initialization means causes said magnetic head to stop the application of the magnetic field to the magneto-optical recording medium for the second period.

4. A magneto-optical recording apparatus according to claim 2, wherein said second initialization means causes said magnetic field application means to apply a magnetic field of the second polarity to the magneto-optical recording medium and causes said laser emission means to emit laser light within the second period immediately before the first period begins.

5. A method of determining a recording laser power for a magneto-optical recording apparatus having a laser strobe magnetic field modulation overwriting capability which successively overwrites marks displaced by a fixed distance from each other to record data onto a magneto-optical recording medium, comprising the steps of:

recording a plurality of marks on a first polarity over a distance longer than a plurality of times the fixed distance in a particular area of a magneto-optical recording medium;

recording marks of a second polarity opposite to the first polarity into the particular area of the magneto-optical recording medium while skipping the marks of the first polarity after at least one predetermined interval so that at least one mark of the first polarity remains after each predetermined interval;

reproducing the marks recorded on the magneto-optical recording medium to obtain a reproduction signal which has a first signal level based on the first polarity and a second signal level based on the second polarity; and determining a recording laser power based on a relationship in length between a period of the first signal level of the reproduction signal and a period of the second signal level.

* * * * *